J. A. DAVIS.

DEVICE FOR MAKING PUFFS AND CURLS OF HAIR.

APPLICATION FILED AUG. 20, 1910.

Reissued July 16, 1912.

13,442.

2 SHEETS—SHEET 1.

Witnesses:

Chas. E. Gorton.

J. E. Hansen.

Inventor:

John A. Davis.

By Chas. C. Tillman

Atty.

J. A. DAVIS.

DEVICE FOR MAKING PUFFS AND CURLS OF HAIR.

APPLICATION FILED AUG. 20, 1910.

Reissued July 16, 1912.

13,442.

2 SHEETS—SHEET 2.

Witnesses:

Chas. E. Gordon

F. E. Hansen

Inventor:

John A. Davis.

By Chas. C. Dillman Atty.

UNITED STATES PATENT OFFICE.

JOHN A. DAVIS, OF CHICAGO, ILLINOIS.

DEVICE FOR MAKING PUFFS AND CURLS OF HAIR.

13,442. Specification of Reissued Letters Patent. Reissued July 16, 1912.

Original No. 920,439, dated May 4, 1909, Serial No. 467,139. Application for reissue filed August 20, 1910. Serial No. 578,259.

*To all whom it may concern:*

Be it known that I, JOHN A. DAVIS, a citizen of the United States, residing at Chicago, in the county of Cook and State of Illinois, have invented certain new and useful Improvements in Devices for Making Puffs and Curls of Hair, of which the following is a specification.

This invention relates to improvements in a device to be used by ladies and hair-dressers for producing puffs of hair, which puffs in the modern toilet are open cylindrical rolls of hair used for adornment, and are made from locks of the natural hair in numbers and arranged on the head to suit the artistic taste of the wearer; and it consists in certain peculiarities of the construction, novel arrangement, and operation of the parts thereof, as will be hereinafter more fully set forth and specifically claimed.

The principal object of the invention is to provide a toilet device of the above-named general character, which shall be simple and inexpensive in construction, durable, light, compact in form, and of such a nature that it can be cheaply manufactured and placed on the market at a small cost.

Another object of the invention is to so construct the body or roller of the device that it will be capable of receiving and retaining clasps which are used in connection with said roller when the puffs are formed and constitute a part of the invention.

A further object of the invention is to so construct the body or roller of the device that it may be easily manipulated by the operator and readily removed from the puff after it has been formed.

A still further object is to furnish retaining clasp of such construction that locks of hair may be securely retained between the clamping-members or bars of the clasps without becoming entangled therewith.

Other objects and advantages of the invention will be disclosed in the subjoined description and explanation.

In order to enable others skilled in the art to which my invention pertains, to make and use the same, I will now proceed to describe it, referring to the accompanying drawings, in which—

Figure 1:
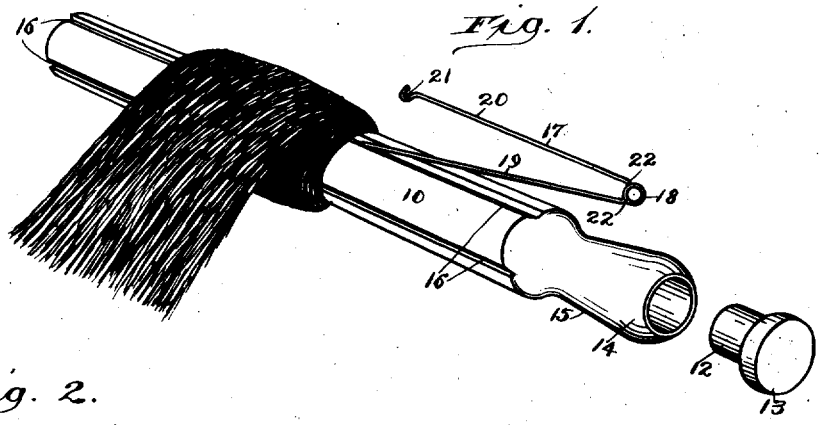
Figure 2:
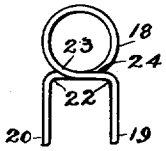
Figure 3:
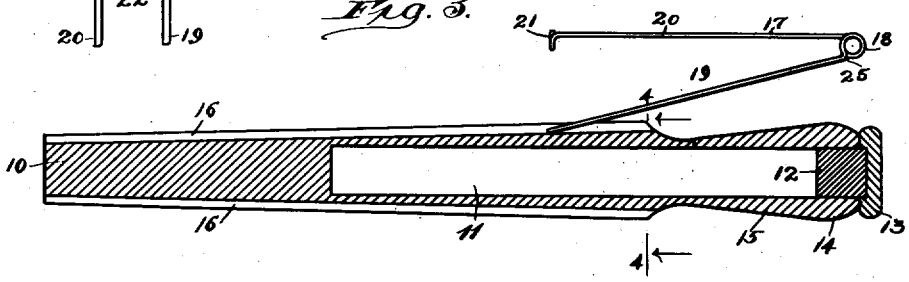
Figure 5:
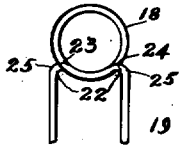
Figure 4:
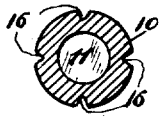
Figure 6:
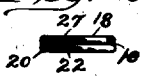
Figure 7:
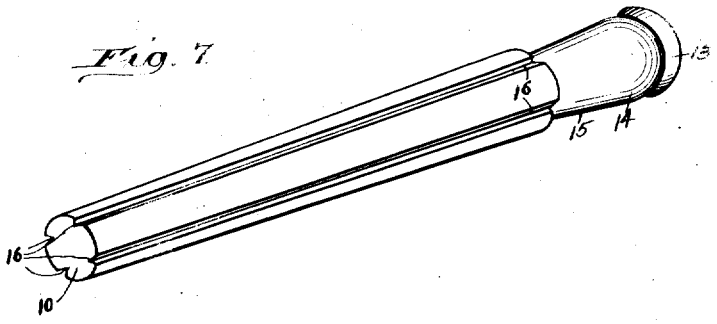
Figure 8:
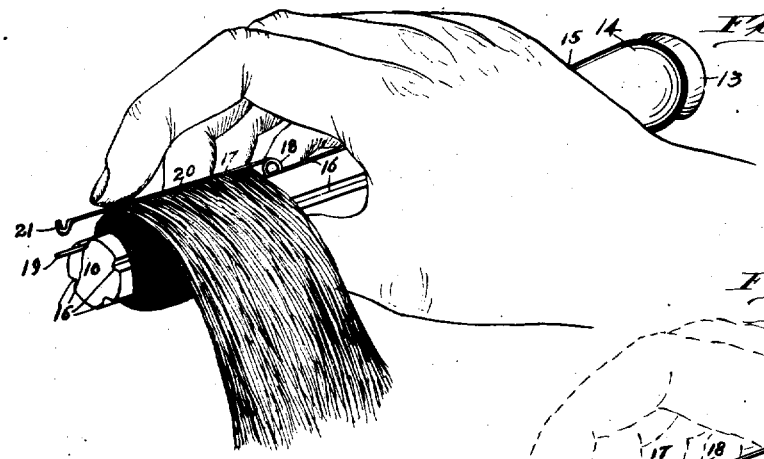
Figure 9:
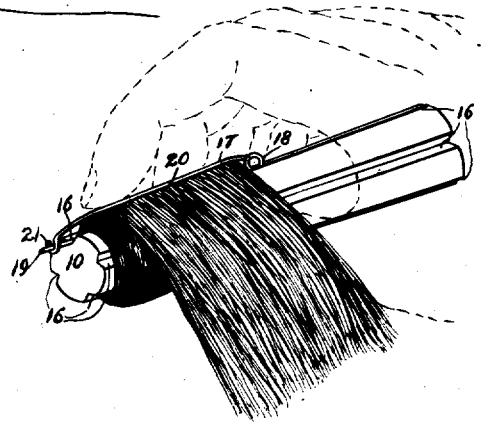

Figure 1, is a perspective view of a toilet device embodying the invention, showing a lock of hair wound on the roller and in the preferred initial position with respect thereto, ready to form a puff, and illustrating a clasp in the act of having one of its bars or members inserted between the lock of hair and roller, to which position said bar will be guided and supported by means of a groove in the roller and the floor of said groove, respectively; Fig. 2, is a greatly enlarged side view of a portion of one of the clasps, showing one of the forms thereof; Fig. 3, is a longitudinal sectional view of the puff-forming roller or body, and a view in side elevation of a modified form of one of the clasps in about the position to be inserted under the puff when the latter is formed on the roller; Fig. 4, is a cross-sectional view of the roller taken on line 4—4 of Fig. 3, looking in the direction indicated by the arrows; Fig. 5, is a greatly enlarged view in side elevation of a portion of the modified form of the clasp shown in Fig. 3, of the drawing; Fig. 6, is an end view of the modified form of the clasp shown in Fig. 5, showing the continuous impinging surfaces of the clamping-bars or members. Fig. 7, is a perspective view of the puff-forming roller or body; Fig. 8, is a similar view of the complete device showing the lock of hair as having been moved from the position shown in Fig. 1, after one bar of the clasp has been extended thereunder, to about the position shown in Fig. 8, so that the free end of said bar will project beyond the reduced solid end of the roller or body, to the end that the other bar of the clasp may be caused to engage the first-named bar by the use of one hand only of the operator; and Fig. 9, is a perspective view of a portion of the roller or body, showing the lock of hair in the same position thereon as illustrated in Fig. 8, and illustrating the bars of the clasp in their engaged position to hold the coiled lock of hair, so that the roller or body may be removed therefrom.

Like numerals of reference, refer to corresponding parts throughout the different views of the drawings.

The reference numeral 10, designates the body of the device, which is herein shown as being made of a solid piece of material having a chamber or cavity 11, extended thereinto from one of its ends, the outer end of which chamber may be closed by means of a stopper 12, having on its outer end a knob or enlargement 13, which may sometimes be utilized in turning the roller or body 10, which roller or body may be made of any suitable material and by any desired means, but it is preferably made of wood on account of the cheapness and the economy with which wooden rollers may be manufactured by automatic machinery commonly employed for producing wood turnings, and finished with any desired wood finish. As shown, the roller or body is provided at the end in which the chamber 11, is located with an enlargement 14, and near said enlargement with a reduced portion 15, thus producing a handle for the manipulation of the roller. In the outer surface of the roller are produced one or more longitudinally extended grooves 16, to allow one of the bars of a clasp to pass under the hair forming the puff, as will be hereinafter described. In some cases the roller may be operated with only one or two grooves, but for the greater convenience and utility of the device, I prefer to provide the roller with a series of grooves sufficient in number to leave but short distances between them.

In conjunction with the grooved roller, a clasp 17, is employed and constitutes a part of the invention. The clasp, as shown in Figs. 1, and 2, of the drawings, is made of spring-wire or steel with a loop 18, having extended therefrom clamping-bars 19, and 20, the former bar being straight while the latter is provided with a hook 12, on its free end to engage the other bar near its free end when the clasp is in position on the puff. As is clearly shown in Fig. 2, of the drawings, the bars 19, and 20, constitute extensions of the loop 18, and cross each other at the front portion of the loop, and each is provided with an offset or shoulder 22, which are located in alinement with one another and substantially at right angles to said bars, to the end that when the bar 19, is secured to the bar 20, by means of the hook 21, said bars will lie in substantial parallelism with one another, yet at a sufficient distance apart to permit of the lock of hair forming the puff being interposed between the same, which will be held in its completed form by means of the clasp. Furthermore by forming the bars 19, and 20, with the offsets or extensions 22, at the front of the loop it is apparent that a continuous contacting or impinging surface between the two portions 22, from about the point indicated at 23, to the point indicated at 24, (see Fig. 2), will be afforded, thus preventing the hair being interposed between the portions 22, and becoming engaged therewith. As the extensions or offsets 22, are formed substantially at right angles to the bars 19, and 20, it is apparent that when the clasp is in the position shown in Fig. 8 or 9, of the drawings the lock of hair will be mainly disposed away from the point midway between the points 23, and 24, and as the hair is disposed transversely with respect to the extensions or shoulders 22, which afford an abrupt abutment, it will be prevented passing between said extensions or shoulders or becoming entangled with the loop of the clasp.

In Figs. 3, 5, and 6, of the drawings, is shown a modification in the construction of the clasp which consists, as before, in extending from the loop 18, a pair of clamping-bars 19, and 20, which, when in their locked positions will be in substantial parallelism with one another but at a slight distance apart. This modification consists in providing the shoulders or extensions 22, at the front of the loop 18, with rearwardly extended bends 25, as is clearly shown in Figs. 3, and 5, of the drawings. By thus forming the extensions or shoulders 22, with the bends 25, it is apparent that the distance between the points 23, and 24, is increased, thus increasing the contacting or impinging surfaces of said shoulders and at the same time providing recesses away from the middle point between the points 23, and 24, for the lock of hair which, it will be understood, is disposed transversely with respect to the extensions or shoulders 22, as in the other construction. In this modified construction it is obvious that a curved abutment instead of a straight one, as in the first above-described construction, will be presented toward the lock of hair, thus causing the same to have a tendency to lie away from the middle portion of the contacting surfaces of said extensions or shoulders.

The operation of the device is simple and as follows: The roller is held in one of the hands of the user and usually by means of the handles 13, and 14, when a lock of hair is wound around the roller as shown in Fig. 1, when the bar 19 of one of the clasps 17 may be inserted in one of the grooves 16 beneath the hair until the free end of the bar 19 is exposed on the opposite side of the puff from that on which the loop 18 is located, when the lock of hair and clasp may be moved to about the positions shown in Figs. 8 and 9 of the drawings, in which operation it is apparent that the straight bar or member 19 of the clasp will project slightly out of the end of the shallow groove in which it rests, when by pressing the finger downwardly upon the bar 20, the hook 21 may be caused to engage the straight bar near its free end, thereby securing the puff of hair already formed. The roller is then withdrawn and the puff preserves its cylindrical form. After the desired number of puffs have been formed they may be arranged on the head to suit the taste of the wearer. For the purpose of facilitating the withdrawal of the roller, the same is preferably tapered from the handle portion to its opposite end.

From the foregoing and by reference to the drawings, it will be readily understood and clearly seen that an important feature of my invention consists of a puff-forming body having a solid or abrupt end and with sufficient body in its exterior portion for shallow grooves to be formed therein; said grooves being of sufficient depth only to allow the bar of the clasp to pass freely between the lock of hair and the body when the former is wound thereon, while the floor of the groove serves as a guide and rest to hold the straight bar firmly in convenient position for the operator to adjust and lock the clasp with the fingers of one hand. It is evident that this operation with one hand only would be impracticable if not impossible, for a lady to perform when dressing her own hair in the event the straight bar were allowed to drop deeply or unconfined into the interior of the roller without a steadying rest for the said bar near the surface of the body to facilitate the locking of the clasp. It will be seen further that by having a series of grooves in the roller in sufficient number to make them but short distances apart, the operator may apply the clasp to the coil of hair as close to or as far from the scalp as may be desired, whereas, with but a very limited number of grooves, the choice of the operator would be so restricted by the greater distances between said grooves as would often require re-rolling the lock of hair until the groove came to about the desired point for applying the clasp.

Another important feature of the invention is to prevent the hair working back between the bars of the clasp or extensions thereof into the loop and becoming entangled therewith which is attained by the construction set forth.

Having thus fully described my invention what I claim as new and desire to secure by Letters-Patent is—

1. As an improved article of manufacture, a device consisting of a cylindrical body having one or more longitudinally extended grooves in its outer surface, a detached clasp comprising two bars connected together at one of their ends by a loop and formed in front of said loop with crossed offsets or extensions impinging against one another and holding the bars when in their engaged positions at a slight distance apart in substantial parallelism, one of the bars of said clasp adapted to be extended longitudinally in a groove of the body, and means to detachably secure the bars together at their free ends.

2. A clasp consisting of two bars connected together at one of their ends and formed in front of said connection with crossed offsets or extensions impinging continuously against one another and holding the bars when in their engaged positions at a slight distance apart in substantial parallelism, one of said bars having on its free end a hook to engage the free portion of the other bar.

3. A clasp consisting of two bars connected together at one of their ends and formed in front of said connection with crossed offsets or extensions impinging against and traversing one another for a distance and holding the bars when in their engaged positions at a short distance apart, and means to detachably fasten the bars together at their free ends.

4. A clasp consisting of two bars connected together at one of their ends and formed in front of said connection with crossed offsets or extensions impinging against and traversing one another for a distance and holding the bars when in their engaged positions at a slight distance apart, each of said offsets or extensions having a rearwardly extended bend, and means to detachably fasten the bars together at their free ends.

5. A device for making puffs and curls of hair, including a substantially solid cylindrical body formed with a hand engaging member at one end, said body being formed on its periphery with a series of grooves, which series extends about the periphery of the body, the grooves being located in close proximity to each other, and extending in alinement with the longitudinal axis of the body, said grooves being comparatively shallow to form a bottom wall which acts to slidably engage and support a hair clasp to permit the clasp to be adjusted and locked with the use of but one hand of the user.

6. A device for making puffs and curls of hair, consisting of a substantially solid cylindrical body formed with a hand engaging member at one end, and a hair clasp, said body being formed on its periphery with a series of grooves, which series extends about the periphery of the body, the grooves being located in close proximity to each other, and extending in alinement with the longitudinal axis of the body, said grooves being comparatively shallow to form a bottom wall which acts to slidably engage and support the hair clasp to permit the clasp to be adjusted and locked with the use of but one hand of the user.

Signed at Chicago, Illinois, this 15th day of August, 1910.

JOHN A. DAVIS.

Witnesses:
J. E. HANSEN,
CHAS. C. TILLMAN.